United States Patent [19]

Eistrat

[11] Patent Number: 4,888,872

[45] Date of Patent: Dec. 26, 1989

[54] CHAIN SAW ATTACHMENT

[76] Inventor: Thomas Eistrat, 1020 S. Almansor St., Alhambra, Calif. 91801

[21] Appl. No.: 244,507

[22] Filed: Sep. 14, 1988

[51] Int. Cl.⁴ .............................................. B23B 21/08

[52] U.S. Cl. .......................................... 30/371; 30/382

[58] Field of Search .................. 30/371, 382, 383, 387

[56] References Cited

U.S. PATENT DOCUMENTS

| | | | |
|---|---|---|---|
| 2,813,556 | 11/1957 | Woodworth | 30/371 |
| 2,821,213 | 1/1958 | York | 30/371 |
| 4,334,358 | 6/1982 | Reynolds | 30/387 |
| 4,534,111 | 8/1985 | Eistrat | 30/371 |
| 4,569,135 | 2/1986 | Morabit | 30/382 X |

OTHER PUBLICATIONS

"Chain Saw Safety; What You Don't Know *Can* Hurt You", American Forests, 9/85, pp. 22–27, 62.

Article by Applicant 1/31/89; "A Chain Saw and I Did Not See Eye-To-Eye".

Bone Scan Report on Applicant's Cancer 4/25/88.

*Primary Examiner*—Frank T. Yost
*Assistant Examiner*—Willmon Fridie, Jr.

[57] ABSTRACT

Safely guides wood into the tip of a chain saw bar and provides stability (you don't have to wave the tip of the saw around before you start cutting at the tip), gives support and dampening of vibration and sound, eliminates rotational kickback, the greatest hazard in using the world's most dangerous tool, can be attachable and removable from a saw bar, or a permanent part of the saw bar. Makes a chain saw an additional tool for tree-trimmers, loggers, homeowners in addition to sawing. With device on saw you can push or pull wood from a tangled up pile and safely position it for cutting. Device eliminates cutting in unsteady positions (off-balance, outstretched arms, one-handed, over-reaching). A chain saw with the device provides dynamic tuning to lessen vibration and sound. There is less chain wear, less sharpening, less bar wear, less fatigue, less chance of Reynolds syndrome, no need for a chain brake to stop rotational kickback, no need for a banana type bar.

9 Claims, 3 Drawing Sheets

CHAIN SAW ATTACHMENT

BACKGROUND—FIELD OF THE INVENTION

This invention relates to making the world's most dangerous tool, a chain saw, safer and more useful. There are about 21,000,000 bar type chain saws in the United States, about 90% carelessly used without any regard to the very high chain saw accident rate.

BACKGROUND—DESCRIPTION OF THE PRIOR ART OF BAR TYPE CHAIN SAWS

It is well known that portable power chain saws create substantial risk and injury to the user, especially when improperly or carelessly used. The hazards relate primarily to the exposed nature of the chain moving along the chain saw bar rail. Chain saws are hand tools, with the control left to the strength and skill of the user, making them especially dangerous. Danger is particularly prevalent when chain saws are used as less than ideal environments, such as wooded areas with damp and dense underbrush or rugged terrain or high up in trees. Such environments may prevent the user from maintaining complete control over the saw.

One dangerous factor in chain saw operation is "kick-back," which produces uncontrollablemovement of the saw. As the moving chain travels around the tip end of the chain saw bar, kickback occurs in prior art when contact is made with another object. The saw violently and rotationally kicks-back from the object which pinched the chain. This causes the bar and chain to quickly rotate upward toward the user's head and can result in severe injury to the user's head and even death.

While the operator may be able to maintain fairly good control over the motor end of the saw, where the handles are located, complete control is not possible without means for firmly controlling the saw tip. In prior art, it is especially important to maximize control and stabilize the saw tip.

Another danger in the chain saw bar is vibration and noise emitted from the tip of the chain bar while cutting wood. Such vibrations and noise from frequent chain saw use contribute to a condition called Raynaud's Syndrome, commonly called "white fingers". Symptoms include tingling, numbness and whitening of the fingers and hands or permanent stiffness as well as loss of hearing.

Vibration and noise from the tip end of the chain is caused by the following, including: wood being cut, structure of the chain and chain bar, wear in the chain, wear and tolerances and cleanliness in the chain bar rail, tightness of the chain, and lubrication of the chain.

The flat sides of a chain bar act as a diaphragm and amplify vibration and noise from the above causes. There is no prior art with a structure applying pressure normal to the side of a chain saw bar, either from within or externally to the bar, to dampen these vibrations.

A chain saw bar with many small holes very close to the bar rail near the bar tip, sometimes filled with plastic, has been used to lessen vibration, without substantially lessening vibrations normal to the flat sides of the chain bar.

Prior art also discloses devices for covering all or at least half of the bar tip to prevent the chain at the tip of the bar from cutting or touching anything. Such devices like chain brakes, also do not prevent freely-waving the end of the chain bar. They do not include means for safely guiding wood to be cut into a moving chain at the tip of the saw bar; they do not provide support at the bar tip before cutting; nor, does a shielded tip in prior art allow cutting with most of the chain at the saw bar tip.

Cutting with the chain at the tip of the chain bar in prior art has been very dangerous and likely to cause severe injury to the operator from kickback.

The prior art also discloses a means for steadying (stabilizing) the tip of a chain saw by making the chain saw bar about twice as long as necessary. There is also a pointed shield on this over-long chain for covering the chain at the tip of the saw. Most users, however, prefer a much safer, shorter saw bar and an unshielded chain at the bar tip.

Although chain saw manufacturers have made great improvements in bar type chain saws, better ways to use a chain saw and additional safety attachments for chain saws are needed by the skilled logger, tree trimmer, and the uninstructed, "weekend woodcutter".

The flat sides of a chain bar act as a diaphragm and amplify vibration and noise from aforesaid causes. There is nio prior art with a structure applying pressure normal to the sides of a solid constructed chain bar. There is no prior art applying pressure normal against either the inside or outside surfaces of a hollow type chain bar.

OBJECTS AND ADVANTAGES

Accordingly I claim the following as objects and advantages of the invention herein: to provide a tool on a chain bar to eliminate rotational kickback while providing cutting with most of the upper and lower tip of the saw bar, and for safely providing wood to be guided along a guide bar structural means into a cutting chain at the tip of the chain bar, with stabilization of cutting, reduction of vibration and sound, as well as providing safe holding means when under-cutting or over-cutting a branch or wood.

In addition I claim the objects and advantages: to provide the attachment of the guide bar structural means to be not only to securely fasten the guide structural means to the saw bar, but also to be part of a vibration and sound absorption means, such as with a suitable vibration and sound damping means, between the guide structural means and the chain bar, and to have suitable fastener means to attach aforesaid parts together in a tuned or tuneable fashion to dampen out vibrations and sound at the chain bar tip when guiding wood into a cutting chain; and also to have vibration and sound absorption means for the guide structural means when attached over a hollow structure chain bar, such as with at least one adjustable spring within the hollow of said hollow bar to press against the inside surfaces of the bar.

In addition I also claim the objects and advantages: to provide with aforesaid vibration and sound absorption means attachment to the chain saw bar a removable or swing-away hook structural means for pulling wood from an otherwise over-reached or tangled up pile into a safer position for cutting, or for a tree trimmer or homeowner to pile or move bruch or tree trimmings out of the way in clean-up.

In addition, I also claim the objects and advantages of the guide structural means which made of an appropriate material of a sufficiently compressible resilient strong plastic composition shaped to be attached against the chain saw bar without a spacer, is another form of this invention. This plastic guide bar, being resilient and compressible, acts in lieu of a spacer. Thus, no spacer is needed for such embodiment.

This plastic guide bar is compressed against the chain bar with the fasteners that securely hold the saw bar and guide bar together. Adjusting the compression by the fastener minimizes vibration and tunes-out noise. The guide bar is also shaped to avoid contact with the chain on the saw bar; shaped to provide an integral or attachable chain catcher; and shaped to have holes for an attachment of a hook for pulliing, if desired.

Readers will find further objects and advantages of the invention herein from a consideration of the ensuing description of the drawing figures, part numbers, claims, and abstracts of the invention. The reader is requested to determine the scope of the invention by the appended claims and their legal equivalent, and not by the examples which have been given, nor by the proferred embodiment.

DRAWING FIGURES WITH PARTS AND OPERATION

Figure 1:
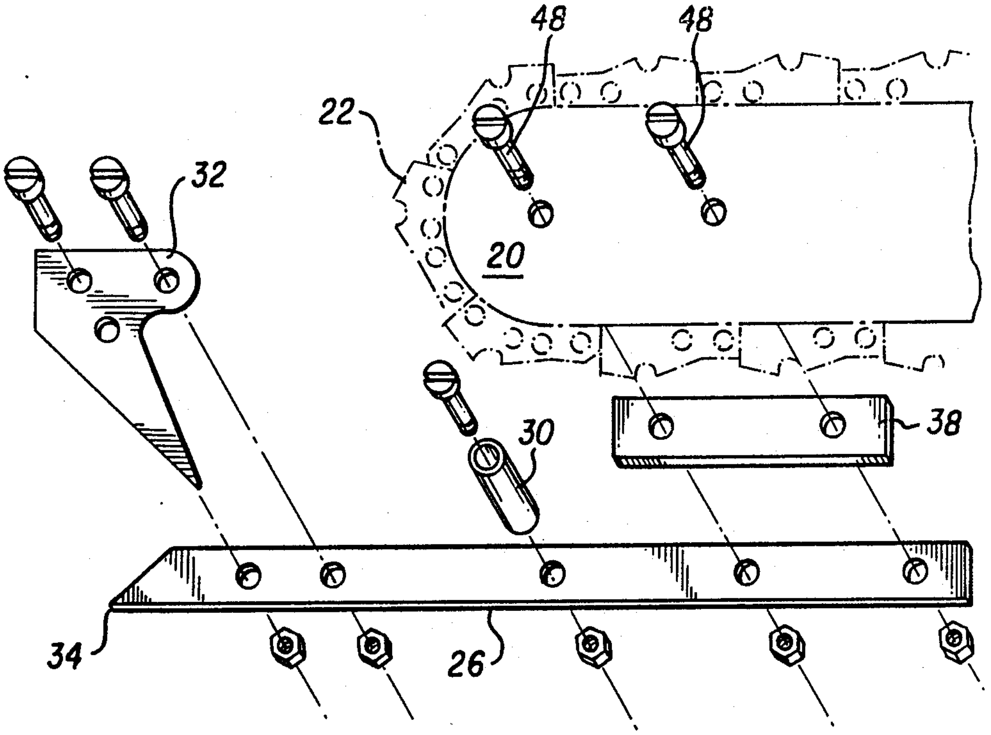
FIG. 1 is an exploded view of the invention in combination with a chain saw guide bar.

FIG. 1, PARTS AND OPERATION: shown is an assembly drawing of parts of this invention ina preferred embodiment. The guide structural means 26 is a small strong stainless steel guide bar. The guide bar is attached to the tip of the saw bar through a vibration absorbing space 38. There are two holes about two-inches apart in the tip of a saw bar made by some manufacturers. With my invention, the guide bar and spacer have holes to fit the saw bar. The adjustable fasteners 48 (shown as bolts with nuts) are installed through the guide bar, spacer and saw bar, fastening them together to compress the spacer sufficiently to minimize vibrations and noise while the chain sw is cutting wood.

A chain catcher 30 with fasteners is attachable to the guide bar. The chain catcher prevents a chain 22 when breaking from whipping and cutting the user. This chain catcher just beyond the tip of the saw bar is better than having a chain catcher only on the saw's engine, close to the user.

The chain saw user should never cut wood in an overreached position. This is the cause of many accidents. Without this invention, (for example as shown in FIG. 1), the user should put down the saw and manhandle the wood into a safe cutting position; he should also move tree cuttings instead of standing in them.

This invented attachment shown in FIG. 1 also makes a chain saw into a new tool. The user stops his saw, and without putting it down on the ground, uses it as a rake to clear away tree cuttings; or to pull or push wood into a safer position for cutting; or with the hook on the guide bar to reach-out and grap a tree limb.

The guide bar in FIG. 1 has a point 24 for holding while pushing wood and an attachable hook 32 for pulling. The hook is attachable to the guide bar with two fasteners and nuts. One form of the hook attachment has three holes instead of two (shown). When a hook might become entangled in brush or in the way of safe cutting, the hook is swung out of the way by rotating the hook on the guide bar and putting a fastener through a different hole in the hook or taking off the hook. This might occur during pulpwood cutting.

Other times, the hook near the outer-end of the guide bar can be used for extended reach. Without moving from his position in a tree, the extended-reach feature gives a tree trimmer a means to get hold of out-of-reach branches for cutting and trimming.

While I have described some uses of this attachment as shown in FIG. 1, it now should be obvious to the potential user that the attachment provides a new, safer, more comfortable, and faster way to use a chain saw.

Figure 2:
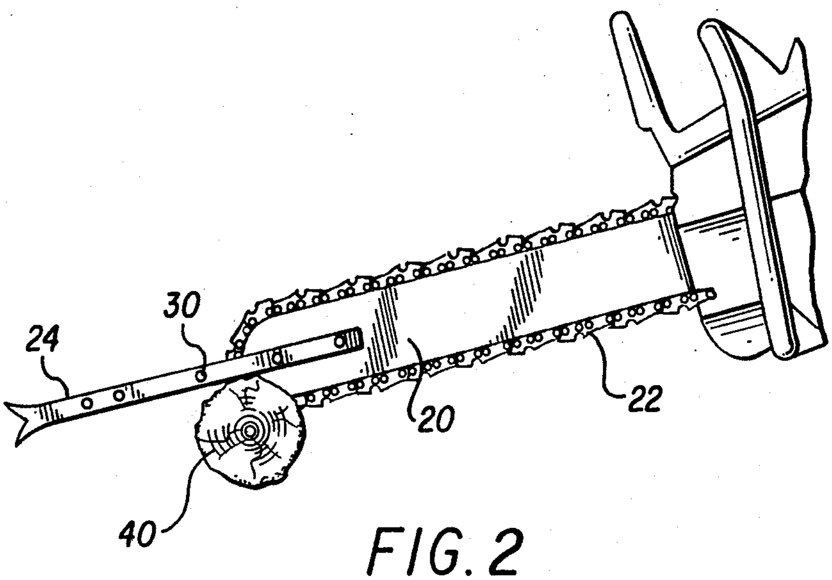
FIG. 2 shows the invention in use overcutting a workpiece.

FIG. 2—OVER-CUTTING: The chain saw with this invented attachment is shown cutting wood 40 at the tip of the chain saw. The guide bar 24 with a point at the end of the guide bar has been placed (not shown) on the wood to be cut. This is done before sliding the wood along the guide bar into the chain; thus, steadying the saw at the end farthest from the user before and during cutting.

After being cut to about a 40% depth, while the guide bar is held against the wood (shown), the guide bar slides along the wood and then the wood is cut through as it approaches bumper spikes (not shown) on the chain saw engine. This is a new, faster, and safer way of cutting with less vibration, less wear on the chain saw parts, and no rotational kickback from the upper half of the chain saw tip.

Holes are shown in the guide bar for attachment of a hook, chain catcher, and attachment of the guide bar to the chain saw bar 20.

It is not shown whether or not there is a vibration absorbing spacer between the guide bar and the chain bar. If there is no spacer, then the guide bar is composed of a strong, compressible, resilient plastic that can be adjustably compressed and act as a vibration absorbing means when the guide bar is fastened onto the chain bar. This plastic type guide ba would be shaped to avoid interference with the chain and to provide an integral or attachable chain catcher as well as to act as a guide bar.

Figure 3:
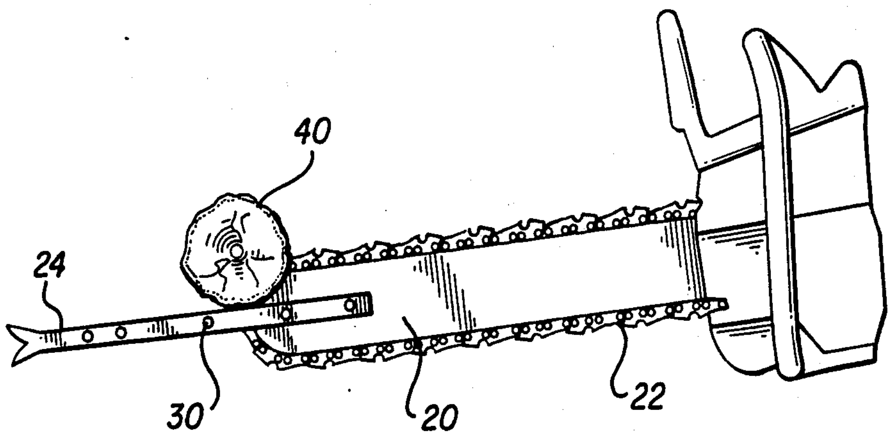
FIG. 3 shows the invention in use undercutting a workpiece.

FIG. 3—UNDER-CUTTING: The parts shown in FIG. 3 are the same as those shown in FIG. 2. The assembly and operation of the parts are also the same, except that under-cutting is being done instead of over-cutting. The benefits of this invention applicable to both over-cutting and under-cutting are stated under FIG. 2.

Figure 4:
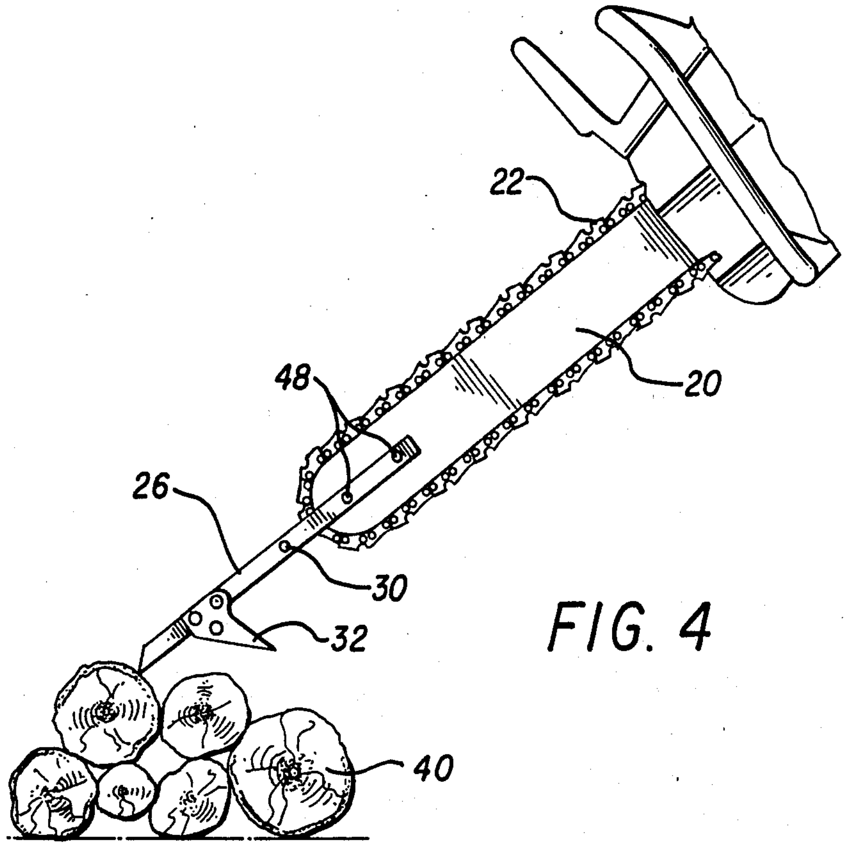
FIG. 4 shows the invention with a hook element and pushing the workpiece to a desired position to be cut.

FIG. 4—PUSHING: The wood 40, not in a safe position, should not be cut with a chain saw. Before this invention when wood was in an unsafe position, the chain saw user should have stopped his saw, put it down on the ground, and moved the wood with his hands, peavey or cant hook. Often, it was not done in the prior art because it took time and effort. As a result, chain saw safety records were abysmal.

This invention gives a user a new tool. The user can safely, quickly, and with less effort than in the prior art move wood into a safer cutting position witout setting down the saw. The guide bar 26 provides the user with a pointed end, which extends from the chain bar 20. This gives the user a safe and easier way to push wood to be cut without setting down the saw. The parts of the invention are attached together as shown in FIG. 1. The hook 32 is an another shape than the hook 34 shown in the following FIG. 5. Both the hooks in FIG. 4 and FIG. 5, however, are detachable and not integral with the guide bar (because in some wood cutting operations a hook is undesirable).

Figure 5:
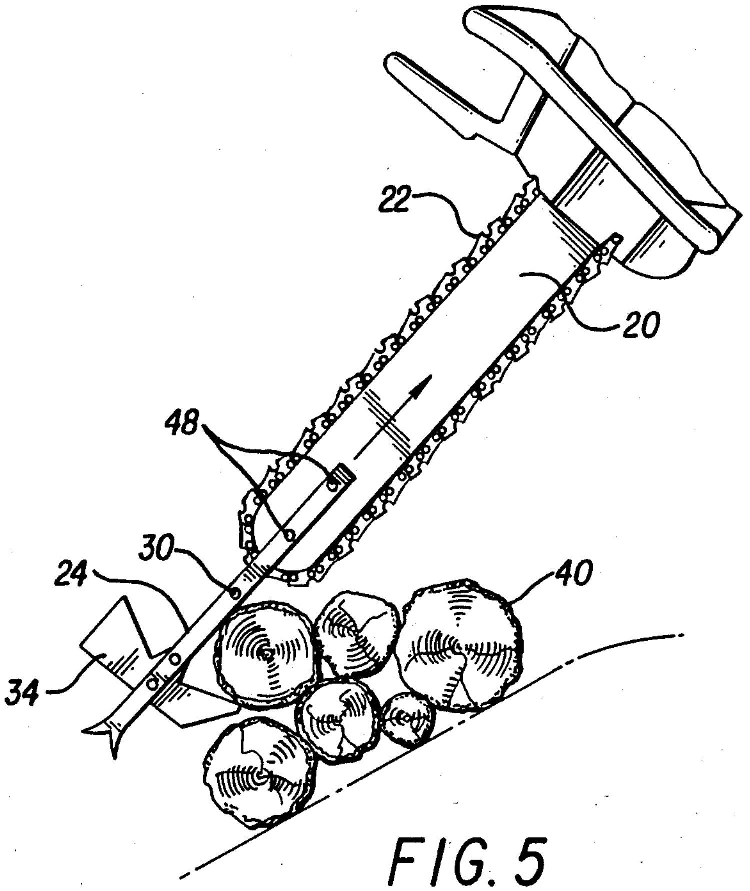
FIG. 5 shows the invention with a hook element and pulling the workpiece to a desired position to be cut.

FIG. 5—PULLING: This drawing shows the invention attached to a chain saw bar 20. The guide bar 24 extends forward beyond the tip of the chain saw bar and has a hook 24 near the outer end of the guide bar. The hook and guide bar are about to pull the wood 40 toward the chain saw user. The user has stopped the chain 22 and no longer needs to put the saw down to move the wood 40. In summary on FIG. 5, this invention makes the chain saw into a new tool that safely moves wood into a safer cutting position without setting the saw down and without moving the wood by hand.

CONCLUSION, RAMIFICATION AND SCOPE OF INVENTION

This chain saw attachment invention is a new, better and safer use of a chain saw. There is no prior art that provides a guide bar attachment for cutting at the tip end of a chain saw. The guide bar holds against wood, tree limbs or logs to be cut while the chain on the upper or lower portion of the chain on the chain bar tip cuts the wood. The wood safely slides along the guide bar into the moving chain at the tip of the saw bar. The guide bar held against the wood provides the only safe means of using the chain on the upper and lower tip of the chain for cutting wood. This invention uniquely steadies the outward end of a chain saw and makes sawing much easier and safer for the user.

Vibration and noise during cutting is substantially reduced by the vibration absorbing spacer attached between the guide bar and the saw bar. Vibration and noise is also reduced by the guide bar being held against a limb or log to be cut—while the moving chain at the tip of the chain bar is slid into the wood to be cut. A vibration absorbing plastic guide bar without a spacer is another form of this invention.

Reduced vibration means less wear on a user's saw and chain, and less possibility of Reynaud's Syndrome to the user's hands.

There is no prior art that provides a guide bar attachment for a chain saw, nor one that has a retractable or removable hook protruding forward beyond the tip of the saw bar. The chain saw with the hook can be used as a tool like a rake to clear away tree cuttings.

While my foregoing descriptions contain many specifics, these should not be construed as limitations on the scope of the invention, but rather as some examples of this chain saw attachment invention. Many other variations are possible in this pioneer structure that enables one to use a chain saw in a safer way than before this invention. Accordingly, the scope of the invention should be determined not by the embodiments illustrated, but by the appended claims and their legal equivalents.

I claim:

1. An attachment for a portion of the tip on a chain saw bar comprising:

a generally projecting forwardly adequate guide structural means from the tip of a chain saw bar on at least one side of the chain saw bar for enabling a workpiece, such as wood or other material, to be engaged over or below the workpiece or wood by the guide structural means and the guide structural means provides a safe steady support to the chain saw bar tip by the outward end of the guide structural means first contacting wood to be cut, and then both during the sliding of the guide structural means over or under the wood to be cut, and then while the guide structural means is holding the wood during cutting with the chain at the tip of the chain saw bar, attaching means for attaching the guide structural means sufficiently clear of the chain on the chain saw bar to securely fasten the guide structural means to the chain saw bar arm on adequate spacer means, the guide structural means is attached to an adequate vibration absorbing spacer means that is attached between the chain saw bar and the guide structural means with adequate adjustable fastener means so that the fastening means can be tensioned to an appropriate dampening of vibration and security of fastening aforesaid attachment to the chain saw bar when a chain on the chain saw bar tip is cutting a workpiece, the guide structural means is a structure of appropriate material and cross-sectional shape with holes in the structure if desired and suitably spaced for attachment of a chain catcher means and a hook pulling means and or point pushing means, and if desired at least one attachable hook pulling means.

2. The attachment of claim 1, further comprising: the guide structural means is a structure without any point thereon farthest from the chain saw bar.

3. The attachment of claim 1, further comprising: the guide structural means is a structure with at least one point thereon farthest from the chain saw bar.

4. The attachment of claim 1, further comprising: the spacer means is composed of elastic material selected from a group of polyurethane foam plastics, vinyls, leaded vinyls, rubbers, silicant sealants, springy flexible shaped metals.

5. The attachment of claim 1, further comprising: there is a sufficiently protruding adequate chain catcher structure clearing and extending beyond and across the chain at the tip of the chain saw bar and integral or attachable to the guide structural means.

6. The attachment of claim 1, further comprising: wherein the chain saw bar has a hollow area near the tip of the chain saw bar, and the attaching means for attaching the guide structural mean to the chain saw attaches at least in part over the hollow area of the chain bar, and there is a spring means within the chain saw bar sufficient to apply outward pressure against the inner sides of the hollow area to provide a tuneable secure fastening means with the attachment of the guide structural means to the chain saw bar.

7. The attachment of claim 1, further comprising: the guide structural means is sufficiently shaped with an offset attached to the chain saw bar without a spacer there is no possible interference between the guide structural means and the chain.

8. An attachment on a portion of a tip of a chain saw bar comprising:

a generally projecting forwardly guide structural means from the tip of a chain saw bar on a least one side of the chain saw bar for enabling a workpiece, such as wood, or other material, to be engaged over or below the workpiece by the guide structural means, and the guide structural means to provide a safe and steady support to the chain saw bar upon the outward end of the guide structural means first contacting wood to be cut, and during both the sliding of the guide structural means over the wood to be cut, and then while the guide structural means is holding the wood during cutting with the chain at the tip of the chain saw bar, an appropriate material of a sufficiently compressible adequately resilient strong plastic composition for the guide structural means that is shaped to be attachable directly to the chain saw bar, to project generally forwardly sufficient to provide a safe steady support for the chain saw bar upon engaging wood to be cut, and then during the sliding by the guide structural means over or under the wood to be cut, and then while the wood is being cut by the chain at the tip of the chain saw, adequate adjustable fastening means for attaching the chain saw bar in a sufficiently secure and tuneable fashion in order to tuneably compress the guide structural means against the chain saw bar to minimize noise and vibration, damage to the chain saw operator, prolong sharpness of the chain, and reduce wear in the chain and saw bar wherein said guide structural means has at least one hole for attaching a swing-out-of-the way hook attachment.

9. The attachment of claim 8, wherein the guide structural means is so shaped that there is a sufficiently protruding integral or attachable adequate chain catcher structure clearing and extending beyond and across from the chain at the tip of the chain saw bar to catch a braking moving chain from striking a chain saw user.

* * * * *